(No Model.)  3 Sheets—Sheet 1.

F. C. TRUSLOW.
MACHINE FOR MAKING HOLLOW CORKS.

No. 523,297.  Patented July 17, 1894.

WITNESSES:
D. Petri-Palmedo
Charles Schroeder

INVENTOR
Frederick C. Truslow
BY
Gaspar & Raegener
ATTORNEYS.

(No Model.)  3 Sheets—Sheet 3.

F. C. TRUSLOW.
MACHINE FOR MAKING HOLLOW CORKS.

No. 523,297. Patented July 17, 1894.

WITNESSES:

INVENTOR
Frederick C. Truslow
BY
ATTORNEYS.

UNITED STATES PATENT OFFICE.

FREDERICK C. TRUSLOW, OF BROOKLYN, NEW YORK, ASSIGNOR TO TRUSLOW & CO., OF SAME PLACE, AND NEW YORK, N. Y.

MACHINE FOR MAKING HOLLOW CORKS.

SPECIFICATION forming part of Letters Patent No. 523,297, dated July 17, 1894.

Application filed May 12, 1893. Serial No. 473,994. (No model.)

*To all whom it may concern:*

Be it known that I, FREDERICK C. TRUSLOW, a citizen of the United States, and a resident of Brooklyn, county of Kings, State of New York, have invented certain new and useful Improvements in Machines for Making Hollow Corks, of which the following is a specification.

This invention relates to a machine for making hollow or tubular corks, such as are used for bottles containing catsup, sauces and similar liquids which are ejected from the bottle through a nozzle that is inserted into the tubular cork in the bottle-mouth, and the invention consists of a machine for making tubular corks which comprises the following elements: a feed-wheel having recesses in its circumference, means for intermittently-rotating said feed-wheel, a hollow rotary cutter by which the cork is hollowed out, a spring-pressed cheek for holding the cork in the recess of the feed-wheel during the boring operation, mechanism by which the rotary cutter is reciprocated, so as to be fed into the cork or withdrawn from the same, and a plunger by which the hollowed-out cork is removed from the recess of the feed-wheel.

The invention consists further of certain details of construction and combination of parts by which the efficient working of the machine is produced, as will be fully described hereinafter and finally pointed out in the claims.

Figure 1:
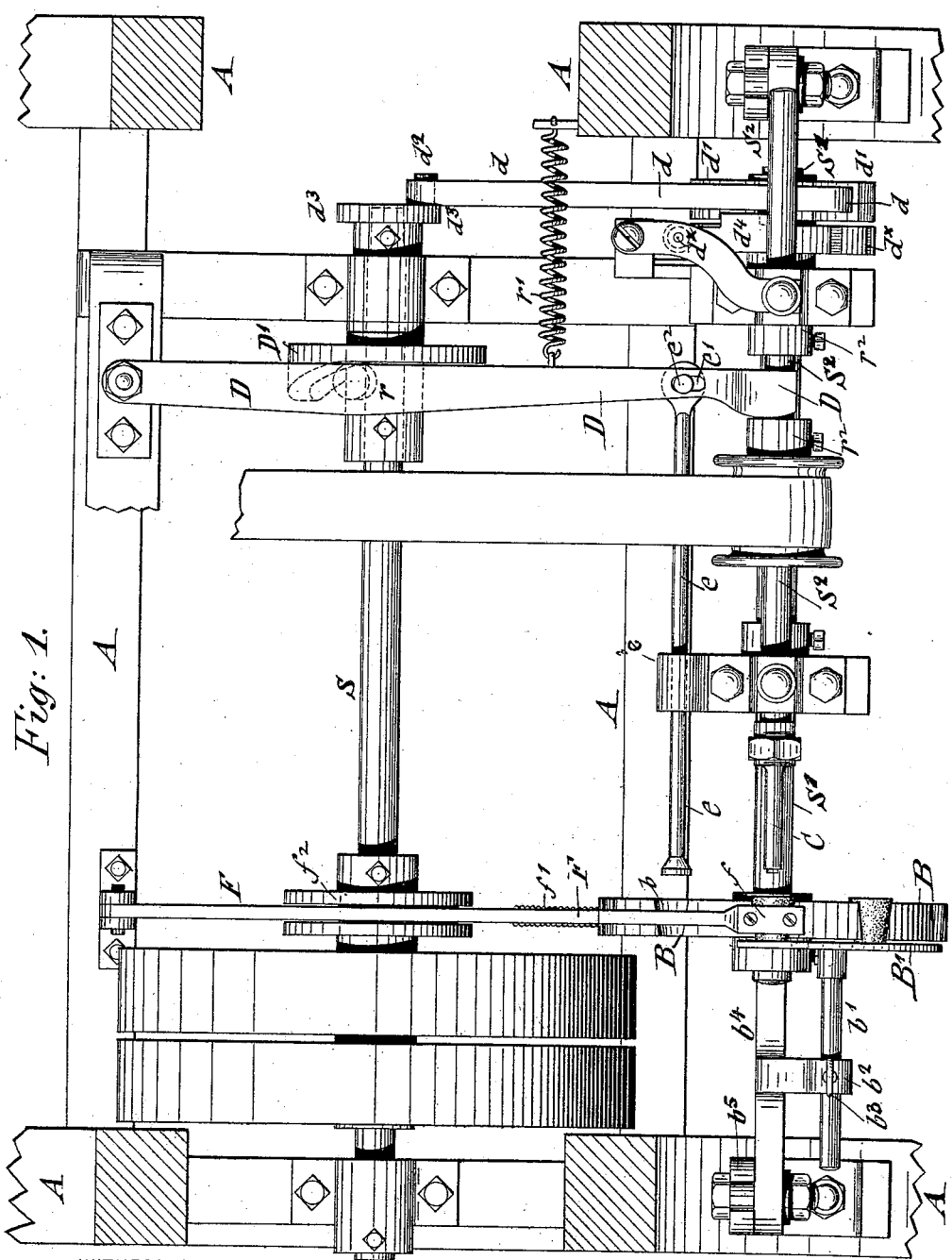
Figure 2:
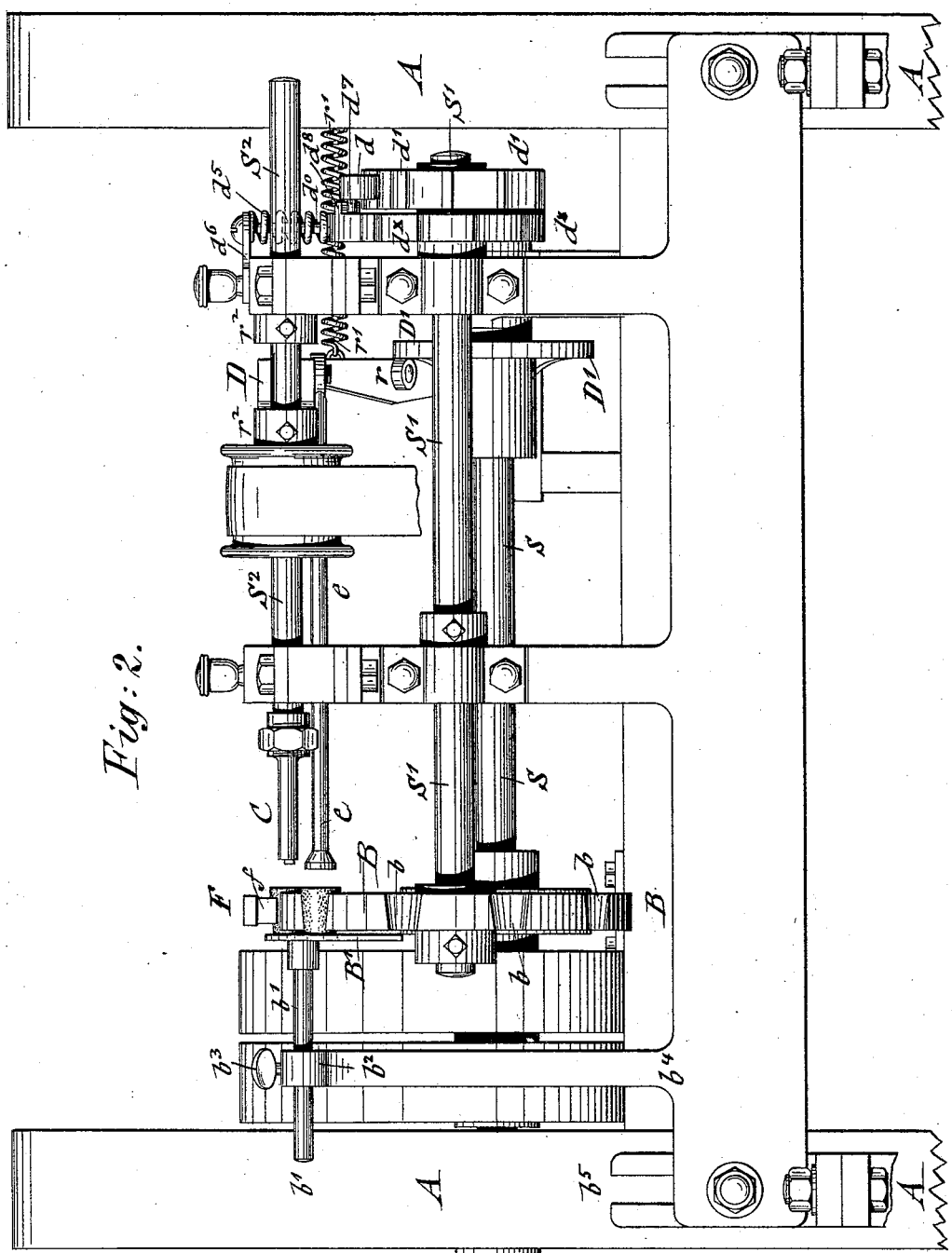
Figure 3:
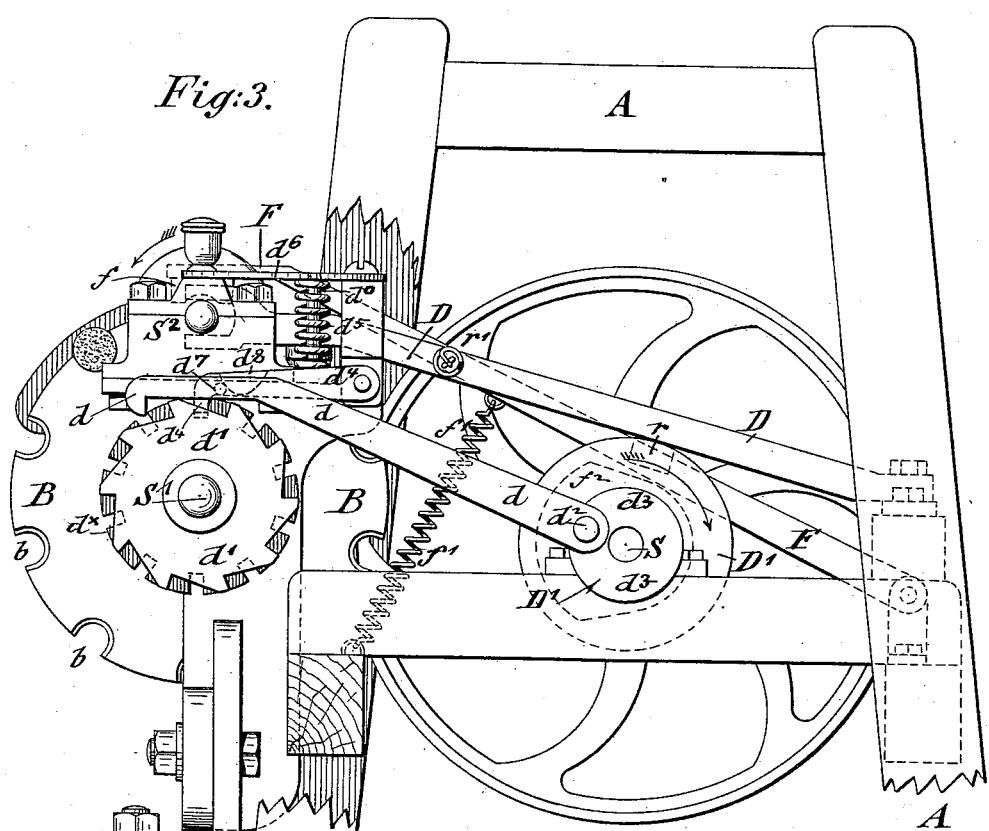
Figure 4:
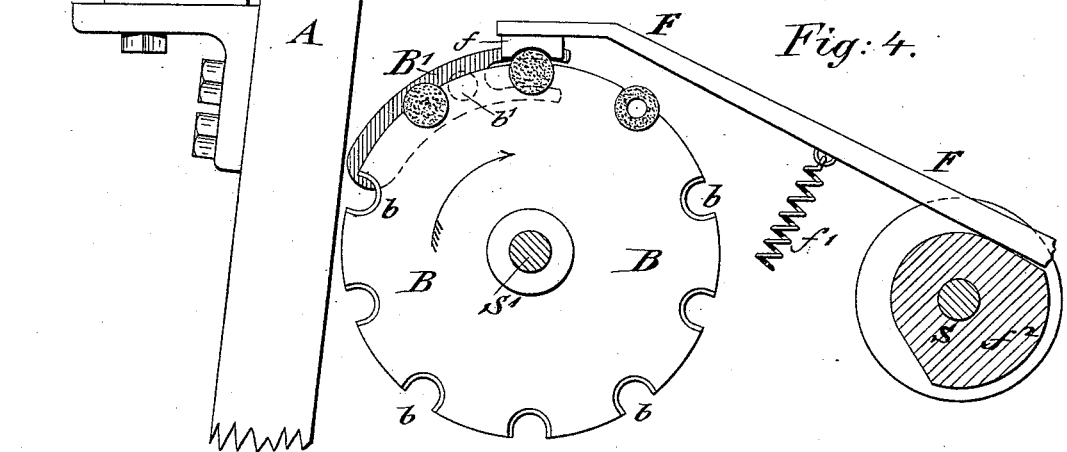

In the accompanying drawings, Figure 1 represents a plan of my improved machine for making hollow corks, partly in section through the upper part of the supporting frame. Fig. 2 is a front-elevation of the same; Fig. 3 a side-elevation, in which parts are broken away, and Fig. 4 is a detail side-view of the feed-wheel and the finger by which the cork is retained in the recess of the same while the boring operation takes place.

Similar letters of reference indicate corresponding parts.

Referring to the drawings, A represents the supporting-frame of my improved machine for making hollow corks. In suitable bearings of the frame A are supported two rotary horizontal shafts S and S'. To the driving shaft S rotary motion is imparted in the direction of the arrow, shown in Fig. 3, by a belt and fast pulley, a loose pulley being arranged sidewise of the fast pulley for permitting the shifting of the belt and the stopping of the machine. A third shaft $S^2$ is supported in suitable bearings of the supporting frame A vertically above the shaft S'. The shaft $S^2$ is provided at the inner end with a hollow cutter C, while the shaft S' carries a vertical feed-wheel B, which is provided with slightly-tapering recesses $b$ in its circumference, said recesses being of somewhat larger than semi-circular shape and adapted to receive the corks that are to be bored out.

On one side of the feed-wheel B is arranged a segmental guide B' which is capable of adjustment nearer to or farther away from the feed wheel B by shifting its stem or spindle $b'$ in a bracket-sleeve $b^2$ provided with a clamping screw $b^3$, as shown clearly in Fig. 1. The bracket-sleeve $b^2$ is supported on an arm $b^4$ which is vertically adjustable in a slotted post $b^5$, of the supporting frame A as shown in Figs. 1 and 2. The segmental guide B' is forked or notched at its rear-end as shown in Fig. 3, so as to permit the passage of the cutter and of the bored out portion of the cork through the recessed rear-end of the guide B'. Intermittent rotary motion is imparted to the feed-wheel B by a pawl $d$ which engages the teeth of a ratchet-wheel $d'$, the inner end of the pawl being pivoted to a wrist-pin $d^2$ of a crank-disk $d^3$ on the end of the driving shaft S, as shown in Fig. 2. At each rotation of the driving shaft S, the crank-disk $d^3$ is rotated, and thereby the ratchet-wheel $d'$ rotated by the pawl $d$ for the distance of one tooth, the number of teeth of the ratchet-wheel corresponding to the number of recesses in the feed-wheel B so that each feed-motion of the pawl $d$ moves the feed-wheel for the distance required to bring the next recess and the cork placed in the same into line with the hollow cutter C. For the purpose of arresting the feed-wheel B after it is moved forward for the distance of one tooth, and locking the feed-wheel in this position, a second ratchet-wheel $d^x$ with square recesses is arranged adjacent to the ratchet-wheel $d'$, the ratchet-wheel $d^x$ being engaged by a check-pawl $d^4$ which is pivoted to an upright post of the supporting frame and acted upon by a helical spring $d^5$ that is interposed between the stop-pawl $d^4$ and a fixed plate $d^6$, as shown in Fig. 2. The spring $d^5$ is retained in position by a pin $d^0$ attached to the plate $d^6$. The actuating pawl $d$ is provided with a projecting pin $d^7$ which engages a rounded off cheek $d^8$ of the check-pawl $d^4$ so that during the backward motion of the pawl $d$ the check-pawl $d^4$ is lifted out of the notches of the second ratchet wheel $d^\times$ so as to permit the intermittent rotary motion of the feed-wheel B by the action of the pawl $d$ on the ratchet-wheel $d'$. As soon as the required extent of motion is produced, the pin $d^7$ on the pawl $d$ passes clear of the cheek $d^8$ so that the check-pawl $d^4$ is immediately dropped into the notch of its ratchet-wheel $d^3$, the feed-wheel B locked in position, and the cork, which is at the time in line with the hollow cutter C, held firmly in position so as to permit the accurate boring-out of the cork by the cutter C.

The shaft $S^2$ of the hollow cutter C can be longitudinally shifted in its bearings, so that the cutter is fed to the cork then in line with the axis of the same. The shifting motion of the shaft of the cutter C is produced by means of a forked lever D which is provided at its middle portion with an anti-friction roller $r$ that is engaged by a raised cam $D'$ on the shaft S, said lever being held in contact with the face of the cam by a helical spring $r'$ that is attached to the lever D and to the supporting frame A as shown clearly in Figs. 1 and 2. The rear-end of the lever D is pivoted to the supporting frame A, so that the forked end of the same can follow the motion of the raised cam $D'$. The forked end of the lever D engages collars $r^2$ on the cutter shaft $S^2$ so as to produce the shifting of the latter in its bearings by the action of cam $D'$ and spring $r'$. A plunger $e$ is pivoted at its rear end to a slot $e'$ near the forked end of the lever D, the pivot $e^2$ having sufficient play in the slot to provide for the oscillating motion of the lever D. The shank of the plunger $e$ is guided in a suitable bracket $e^3$ of the supporting frame, so that whenever the hollow cutter passes through the cork at the time in line with the same, the plunger passes into the next adjacent recess $b$ of the feed-wheel B and pushes the bored-out cork out of the recess at the opposite side of the feed-wheel B whence it is dropped into a suitable receptacle. While the boring action takes place, the cork is retained in the recess of the feed-wheel B by means of a finger $f$ formed with a concave recess to receive one convex side of a cork and located at the upper end of a spring-actuated lever F which is pivoted at its lower end to the frame A. The tension of the spring $f'$ presses the finger $f$ firmly on the cork so as to prevent its being pushed out of the recess of the feed-wheel while the boring action takes place. As soon as the boring action is finished, a cam $f^2$ on the driving shaft S raises the lever F so as not to interfere with the forward motion of the feed-wheel B and when the next cork is in position below the finger $f$, the same is applied again to the cork by the action of its spring $f'$ so as to hold it firmly in position for the boring action of the cutter C.

The operation of my improved machine for making hollow corks is as follows: The attendant sits in front of the feed-wheel and feeds one cork after the other to the recesses of the same. The rotary intermittent motion which is imparted to the feed-wheel moves one cork after the other into line with the hollow cutter. As soon as the cork arrives axially in line with the cutter, the feed-wheel is arrested and locked and the cutter shifted forward so as to bore out the cork. Simultaneously, the plunger forces out the bored out cork, located in the next adjacent recess of the feed-wheel, so as to remove the same from the recess of the feed-wheel. The segmental guide B' is adjusted to the length of the corks, and serves to prevent the shifting of the corks while they are subjected to the boring action of the cutter, the finger preventing the axial shifting of the same. Straight or tapering corks can be bored out by the machine in a perfectly regular and reliable manner, so that they can be easily fitted into bottles for which the same are intended, while the discharge-nozzles can be easily inserted into the central opening of the corks.

Having thus described my invention, I claim as new and desire to secure by Letters Patent—

1. The combination, of an intermittently-rotating feed wheel, having recesses in its circumference, a segmental guide arranged alongside of the feed wheel and having a notch adapted to register with said recesses, one at a time, means for adjusting said guide, a rotary cutter, means for shifting the same in a longitudinal direction, so as to bore out the cork in line with the cutter, and a reciprocating plunger located to one side of and that is moved with the cutter, so as to remove the bored-out cork while the cutter bores the cork in line therewith, substantially as set forth.

2. The combination of a feed-wheel having recesses in its circumference, a curved guide located alongside of the upper part of the feed-wheel and provided with a forked or notched rear-end and arranged concentrically with said recesses, a rotary cutter, means for longitudinally shifting the cutter, a spring-actuated finger having a concave recess for receiving and holding the corks in the recesses of the wheel while the boring action takes place, and a reciprocating plunger that removes the bored-out cork in the recess adjacent to the cork which is then bored out by the cutter, substantially as set forth.

In testimony that I claim the foregoing as my invention I have signed my name in presence of two subscribing witnesses.

FREDK. C. TRUSLOW.

Witnesses:
PAUL GOEPEL,
CHARLES SCHROEDER.